(12) United States Patent
Burden

(10) Patent No.: X8448
(45) Date of Patent: Oct. 14, 1834

(54) FURNACE, HEATING BAR IRON

(76) Inventor: Henry Burden

Henry Burden
Letters Patent

The schedule referred to in these Letters Patent and making part of the same, containing a description in the words of the said Henry Burden himself of his improvement in the construction of furnaces for the purpose of heating Bar or other Iron with anthracite and bituminous Coal combined.

---

To all to whom these presents shall come. Be it known that I Henry Burden of the City of Troy in the County of Rensselaer, and State of New York have invented a new and useful improvement in the construction of Furnaces for the purpose of heating bar or other Iron with anthracite and bituminous Coal combined, and that the following is a full and exact description of the construction, and operation of said furnace as invented by me.

The common method of constructing furnaces for heating bar Iron with anthracite Coal, is to make the furnace about three feet wide and four or five feet long with grates of these dimensions, with a sliding door in one end for the purpose of putting in the coal and Iron, as also for drawing the Iron out when hot. The grates are then covered with from three to four inches of Anthracite coal ignited on the top of which, the Iron bars to be heated are laid, by shutting the door and drawing the damper, the Iron consequently becomes heated proportionate to the heat of the furnace, but as there is no flame from anthracite coal to fill the space between the ignited coal and the arch, consequently a rush of air enters through the grates greater at some places than others, in consequence of their being more open or clear of ashes which often burns or melts the Iron at spots while it is but partially heated at others.

In order to remedy this defect I make my furnace about one foot
longer than I should if using anthracite coal alone, with a door
at each end of the furnace of similar dimensions and shape,
I then proceed by putting a layer of anthracite coal on the grate
of from three to four inches thick with the Iron on the top
in every respect as if I were to use anthracite coal alone as
mentioned above. When the Iron becomes heated sufficiently
(or as hot as may be by the anthracite coal without burning
at spots) I then open the door behind (as may be seen at i. fig
1 of the accompanying drawings) and put in about one or two
small shovel fulls of bituminous coal into the back part of the
furnace (as may be seen at f fig. 1 of the drawings) which imme-
diately flashes into flame and rushes along through the iron
bars with great velocity on its way to the chimney as may be more
distinctly seen at fig 1. of the accompanying drawings. It will
be easily discovered that the Iron bars being completely immers-
ed in one continued sheet of flame for a few seconds will become
as hot as if laid on a sand bed and heated by flame altogether,
as is done in the common reverberating or puddling furnace
at an expence not exceeding one third that of bituminous coal or
wood alone. The improvements which I claim are as follows. First by
making my furnaces with a door at the back end so as to admit of
the bituminous coal being put into the back part of the
furnace as is more fully explained by the drawings & Specifi-
cations. Secondly By using the bituminous coal on a part
of the grate at the back part of the furnace reserved for that
purpose which gives the coal an opportunity of ignition (as well
as could be by a reverberating or puddling furnace) before it
comes in contact with the Iron. The advantages of this method are
great as may be more distinctly seen by the drawings & specifications.
Thirdly - The improvement consists in combining the use of
the anthracite and bituminous coal for the purposes of heating bar or other Iron at the same time igniting each in separate parts of the furnace as mentioned above and described by the specifications and drawings annexed.

Witnesses
D. H. Stone
Justus Kellogg

Henry Burden

Exd. W.P.
(768 words)

Patented October 14. 1844.—

Mallet Ass